United States Patent [19]

Seitz

[11] Patent Number: 5,268,130
[45] Date of Patent: Dec. 7, 1993

[54] MELAMINE FORMALDEHYDE MICROENCAPSULATION IN AQUEOUS SOLUTIONS CONTAINING HIGH CONCENTRATIONS OF ORGANIC SOLVENT

[75] Inventor: Michael E. Seitz, Miamisburg, Ohio

[73] Assignee: The Standard Register Company, Dayton, Ohio

[21] Appl. No.: 632,042

[22] Filed: Dec. 20, 1990

[51] Int. Cl.$^5$ .............. B01J 13/18; B41M 5/165
[52] U.S. Cl. ........................ 264/4.7; 503/215
[58] Field of Search ............ 264/4.7, 4.33; 428/402.21; 503/215

[56] References Cited

U.S. PATENT DOCUMENTS

| | | | |
|---|---|---|---|
| 4,640,714 | 2/1987 | Kagota et al. | 106/21 |
| 4,889,877 | 12/1989 | Seitz | 523/161 |
| 4,940,738 | 7/1990 | Seitz | 523/161 |
| 4,940,739 | 7/1990 | Seitz | 264/4.7 X |
| 4,985,484 | 1/1991 | Yoshida et al. | 428/402.21 |

Primary Examiner—Richard D. Lovering
Assistant Examiner—John M. Covert
Attorney, Agent, or Firm—Killworth, Gottman, Hagan & Schaeff

[57] ABSTRACT

A process for making melamine-formaldehyde microcapsules in an aqueous solution containing a high concentration of a water miscible or water soluble organic solvent is provided. The aqueous solution is prepared and a water insoluble melamine-formaldehyde pre-condensate is dissolved therein by adjusting the temperature and organic solvent concentration of the aqueous solution such that the melamine-formaldehyde pre-condensate is barely soluble therein. A substance to be encapsulated, preferably an oily solution containing a dyestuff precursor, is dispersed into the aqueous solution to form an emulsion, the melamine-formaldehyde pre-condensate being insoluble in the substance to be encapsulated. The melamine-formaldehyde pre-condensate is separated from the aqueous solution onto droplets of the substance to be encapsulated and the self-condensation reaction of the phase-separated melamine-formaldehyde pre-condensate initiated to form capsule walls around the droplets, thereby producing melamine-formaldehyde microcapsules in the aqueous solution containing a high concentration of a water miscible or water soluble organic solvent.

18 Claims, No Drawings

MELAMINE FORMALDEHYDE MICROENCAPSULATION IN AQUEOUS SOLUTIONS CONTAINING HIGH CONCENTRATIONS OF ORGANIC SOLVENT

BACKGROUND OF THE INVENTION

The present invention relates to a process for making carbonless copy paper coatings containing melamine-formaldehyde (hereinafter referred to as "MF") microcapsules and to carbonless copy papers coated therewith. More particularly, the present invention relates to a process of preparing MF microcapsules in a medium of water containing high concentrations of water soluble or water miscible organic solvents.

In the manufacture of pressure-sensitive recording papers, better known as carbonless copy papers, a layer of pressure-rupturable microcapsules containing a solution of colorless dyestuff precursor is normally coated on the back side of the front sheet of paper of a carbonless copy paper set. This coated back side is known as the CB coating. In order to develop an image or copy, the CB coating must-be mated with a paper containing a coating of a suitable color developer, also known as dyestuff acceptor, on its front. This coated front side is called the CF coating. The color developer is a material, usually acidic, capable of forming the color of the dyestuff by reaction with the dyestuff precursor.

Marking of the pressure-sensitive recording papers is effected by rupturing the capsules in the CB coating by means of pressure to cause the dyestuff precursor solution to be exuded onto the front of the mated sheet below it. The colorless or slightly colored dyestuff precursor then reacts with the color developer in the areas at which pressure was applied, thereby effecting the colored marking. Such mechanism for the technique of producing pressure-sensitive recording papers is well known.

Also well known are self-contained (SC) sheets which have the CB coating and the CF coating layered or admixed on a support sheet. Such sheets are also considered to be carbonless copy papers.

Microencapsulation has been used in the production of carbonless copy papers for some time. It is well known to use MF in the microencapsulation process as the material to construct the microcapsule wall.

Typically, a water soluble MF pre-condensate is dissolved in an aqueous solution (the external or continuous water phase). An oily solution containing therein a dissolved dyestuff precursor solution (the internal phase or core material) is dispersed in the water phase using a water soluble polymer as an emulsifier which can be either ionic or non-ionic in nature. A self-condensation reaction of the MF is initiated by lowering the pH of the emulsion and adding heat thereto. As the molecular weight of the MF pre-condensate increases, it precipitates (or more precisely, liquid-liquid phase separates) onto the oil droplets whereon further condensation of the MF completes the formation of the capsule wall.

Variations of this general reaction scheme can be found in the prior art. For example, U.S. Pat. Nos. 4,460,722 and 4,562,116 disclose the simultaneous condensation of a water soluble cationic urea resin along with a water soluble MF pre-condensate from an aqueous solution onto the surface of an oil droplet.

Disclosed in U.S. Pat. No. 4,409,156 is the addition of a water soluble styrene-sulfonic acid polymer to the water phase prior to initiation of the self-condensation reaction of a water soluble MF pre-condensate. Similarly, U.S. Pat. Nos. 4,406,816 and 4,574,110 disclose the inclusion, to the external phase prior to MF self-condensation, of a polymer having attached thereto a sulfonic acid group and an acrylic copolymer, respectively.

All traditional MF-type encapsulation methods found in the prior art utilize an aqueous external phase to serve as both the medium in which the microcapsules are formed and as the vehicle in which the microcapsules are coated as a part of the CB materials. Water, however, is unsuitable as a coating vehicle in certain applications. Following the application of the coating composition, the coating vehicle must be evaporated. In the case of water, this requires a considerable input of energy and the use of complex and expensive equipment. For a variety of reasons, such energy usage, complexity, and cost cannot be tolerated in some applications. Another problem of concern is the removal of the polluted water which emanates from the production and purification of the aqueous coating composition. Additionally, certain substrates such as paper are sensitive to water and tend to wrinkle upon drying.

In these types of applications where water cannot be used as the sole coating vehicle, an alternative must be used. The most common alternative to water as a microencapsulation medium and coating vehicle is an organic solvent. Organic solvents have inherent disadvantages as well (mainly in the recovery of evaporated organic solvent vapors), but in those applications where large amounts of water are unsuitable, these disadvantages are either avoidable (by using nonvolatile solvents) or are generally an acceptable compromise. Thus, it is desirable and even necessary in some applications to use organic solvents or water-organic solvent blends as the microencapsulation medium and coating vehicle However, traditional MF microencapsulation techniques do not permit MF microencapsulation in an organic medium. To the extent that organic solvents are present in the external phase, the MF self-condensation reaction cannot take place. For this reason, all of the traditional MF microencapsulation methods found in the prior art must be conducted using water as a microencapsulation medium and, consequently, as a coating vehicle. Organic solvents that are used as a microencapsulation medium and coating vehicle contain chemical groups that react with the MF pre-condensate under acidic conditions. Such acidic conditions are required to initiate the MF self-condensation reaction. Alcohol, ester, amide, hemiacetal, and acetal groups commonly found in organic solvents used in coating formulations react with the MF pre-condensate to produce useless by-products.

At higher concentrations of organic solvent in the external phase, the competing MF-solvent side reactions dominate, and the MF self-condensation reaction occurs only to a minor extent (if at all). Only low molecular weight polymers and modified MF condensates that remain plastic are formed when self-condensation of MF is attempted in a medium containing a relatively high concentration of organic solvent. Such by-products do not separate from the external phase to collect on and coat the oil droplets. As a consequence, attempts to form MF microcapsules in an external phase containing a high concentration of organic solvent and using aqueous methods known in the prior art with water-soluble MF pre-condensates result in failure. Thus, MF microencapsulation techniques of the prior art cannot be utilized in applications where water is not suitable but where organic solvents would otherwise be suitable.

Accordingly, the need exists in the art for a MF microencapsulation process that can take place in an external phase containing high concentrations of organic solvents and where water alone is not suitable as a coating vehicle.

SUMMARY OF THE INVENTION

That need is met by the present invention which provides a process for making MF microcapsules in a medium of water having a high concentration of a water miscible or water soluble organic solvent by inducing liquid-liquid phase separation of the MF pre-condensate through physical means at a near neutral or alkaline pH before conducting the condensation reaction under acidic conditions. The result is a slurry of MF microcapsules in a coating vehicle containing a high concentration of an organic solvent which is suitable for use in applications where purely water-based coating vehicles are unacceptable.

In accordance with one aspect of the present invention, a process for making melamine-formaldehyde microcapsules in an aqueous solution containing a high concentration of a water miscible or water soluble organic solvent is provided and includes the steps of preparing the aqueous solution containing a high concentration of a water miscible or water soluble organic solvent and dissolving therein a water insoluble melamine-formaldehyde pre-condensate. This dissolution of the melamine-formaldehyde pre-condensate is accomplished by adjusting the temperature and organic solvent concentration of the aqueous solution so that the melamine-formaldehyde pre-condensate is barely soluble therein. The pH of the aqueous solution is maintained in the alkaline range during the dissolution step to prevent the self-condensation reaction of the melamine-formaldehyde from occurring prematurely.

A discontinuous phase of a substance to be encapsulated is dispersed into the aqueous solution to form an emulsion, with the melamine-formaldehyde pre-condensate being insoluble in the substance. The melamine-formaldehyde pre-condensate is then separated from the aqueous solution onto droplets of the substance to be encapsulated so that the droplets are enveloped in a liquid film of the melamine-formaldehyde pre-condensate. The self-condensation reaction of the phase-separated melamine-formaldehyde pre-condensate is then initiated to form capsule walls around the droplets of the substance, thereby producing melamine-formaldehyde microcapsules in the aqueous solution containing a high concentration of a water miscible or water soluble organic solvent. In a preferred embodiment of the invention, the substance to be encapsulated comprises an oily solution which has dissolved therein a dyestuff precursor which is capable of reacting with a color developer.

The formaldehyde to melamine mole ratio of the melamine-formaldehyde pre-condensate is preferably from about 2:1 to 3:1. The melamine-formaldehyde pre-condensate may also be alkylated.

The step of separating the melamine-formaldehyde pre-condensate from the aqueous solution may be effected by decreasing the temperature of the emulsion to below the turbidity point of the aqueous solution. Alternatively, or in addition to decreasing the temperature of the emulsion, the step of separating the melamine-formaldehyde pre-condensate may include the steps of simultaneously diluting the emulsion with water to induce further phase separation of the melamine-formaldehyde pre-condensate onto the droplets of the substance to be encapsulated while decreasing the pH of the emulsion. The amount of water added in the water dilution step is preferably from about 1% to 3% of the total volume of the emulsion.

Where simultaneous water dilution and pH reduction is utilized, it is preferably carried out in a sequential, stepwise fashion until the pH of the emulsion has been decreased to below about 5.0. Additionally, between each sequential simultaneous water dilution and pH reduction step, the emulsion is gradually heated and then cooled to a temperature below that of the turbidity point of the aqueous solution.

The step of initiating the self-condensation reaction is effected by decreasing the pH of the aqueous solution to below about 7.0 by the addition of an acid. The steps of separating the melamine-formaldehyde pre-condensate from the aqueous solution and the step of initiating the self-condensation reaction may be effected sequentially or simultaneously. Where the steps are carried out simultaneously, preferably an aqueous solution of an acid is added to the emulsion. After the microcapsules have formed, their pH is adjusted to a neutral pH.

The organic solvent used in the process of the present invention is selected from the group consisting of low molecular weight carbohydrates, glycols, polyhydric alcohols, amides, and compatible mixtures thereof. Protective colloids may also be added to the aqueous solution prior to the dispersion of the substance to be encapsulated.

In an alternative embodiment of the invention, the step of separating the melamine-formaldehyde pre-condensate is effected by holding the temperature of the aqueous solution constant and simultaneously diluting the emulsion with water while decreasing the pH of the emulsion. The amount of water added in the separation step is determined by the solubility curve of the melamine-formaldehyde pre-condensate as a function of the percentage of the organic solvent in water.

The simultaneous water dilution and pH reduction may be carried out in a sequential, stepwise fashion over a period of time until the pH of the emulsion has been decreased below about 5.0. It may be effected by the addition of a dilute aqueous solution of acid.

The process of the present invention produces a slurry of melamine-formaldehyde microcapsules in an aqueous solution containing a high concentration of a water miscible or water soluble organic solvent. In a preferred embodiment of the invention, the melamine formaldehyde microcapsules contain an oil having a dyestuff precursor dissolved therein. This coating vehicle may then be used in applications, such as the coating of carbonless papers, where purely water-based vehicles may cause wrinkling and curling of the paper and may require extensive drying times at high energy costs.

Accordingly, it is an object of the present invention to provide a process for the production of MF microcapsules in aqueous solutions having high concentrations of an organic solvent, and the MF microcapsule coating slurry produced thereby. These and other objects, features and attendant advantages of the present invention will become apparent to those skilled in the art from a reading of the following detailed description of the preferred embodiment and the appended claims

DETAILED DESCRIPTION OF THE PREFERRED EMBODIMENT

In a preferred embodiment of the invention, a slurry of the MF microcapsules are produced in an aqueous solution having a high concentration of a water soluble or water miscible organic solvent. By high concentration of organic solvent, it is meant that the aqueous solutions contains at least 25% to as much as 75% by weight of a water soluble or water miscible organic solvent. The resultant MF microcapsule coating slurry thus has a high concentration of organic solvent and is suitable for use in applications in which the substrate or support is sensitive to water or in those applications requiring low energy drying.

One preferred method of producing the MF microcapsule coating of the present invention begins with the preparation of the external phase. First, an aqueous solution containing a high concentration of organic solvent is made. Examples of suitable water soluble or water miscible organic solvents include nonvolatile solvents such as low molecular weight carbohydrates such as glucose or methyl glucoside; glycols such as ethylene glycol, diethylene glycol, triethylene glycol, and higher polyethylene glycols; polyhydric alcohols such as sorbitol, glycerol, and trimethylolethane; and amides such as dimethyl hydantoin, dimethyl hydantoin formaldehyde resin, and diethyl urea. Compatible mixtures of organic solvents may also be used. A preferred organic solvent for use in the present invention is methyl glucoside because of its quick-drying characteristics with low energy requirements. In addition, upon drying of the microcapsule slurry coating on a substrate, methyl glucoside produces a non-hygroscopic film.

The MF pre-condensate used in the present invention can either be prepared separately (and later added to the external or continuous aqueous phase) or within the external phase. The term MF pre-condensate, as used herein, indicates a pre-polymer of any one of a mixture of formaldehyde and at least one of the methylol melamines such as mono- to hexa- methylol melamines, melamine and formaldehyde, and any oligomers obtained by the further reaction of melamine and formaldehyde with a degree of polymerization of between about 2 to 10. Regardless of where the MF pre-condensate is prepared, the external phase should be maintained under alkaline pH conditions so that when the MF pre-condensate is introduced therein, the MF self-condensation reaction does not yet begin. More importantly, the external phase should be kept alkaline at this point so that when the MF pre-condensate and organic solvent are both present therein, MF-solvent side reactions do not occur.

In one embodiment of the invention, the MF pre-condensate is dissolved into the aqueous solution containing high concentrations of organic solvent. Preferably, the organic solvent concentration and temperature of this aqueous solution is adjusted so that the MF pre-condensate is barely soluble therein. The temperature above which the pre-condensate dissolves is a function of the MF pre-condensate, the nature of the organic solvent, and the amount of water. The minimum temperature for solubility in a particular system can easily be determined by heating and cooling blends of solvent and pre-condensate and recording the point at which turbidity appears and disappears. The MF pre-condensate is chosen or produced to be water insoluble but soluble in the water/organic solvent mixture. The MF pre-condensate should also be insoluble in the substance to be encapsulated (i.e. the internal phase which will become the capsule core material).

Preferably, the MF pre-condensate has a low formaldehyde to melamine mole ratio. Even more preferably, the formaldehyde to melamine mole ratio is from about 2:1 to 3:1. Such low formaldehyde to melamine mole ratios reduce the water solubility of MF pre-condensates as compared to those having higher mole ratios of from about 5:1 to 6:1 which result in more water tolerant MF pre-condensates. A MF pre-condensate having the desired solubility characteristics can also be produced by alkylating a MF pre-condensate. In addition, several suitable MF pre-condensates are commercially available. For example, Cymel 401 from American Cyanamid Company has the proper solubility and reactivity.

The degree of solubility, or point of turbidity, of the MF pre-condensate in the aqueous solution containing organic solvent is directly proportional to both the temperature of the solution and the organic solvent concentration therein. The point of turbidity is the condition at which the MF pre-condensate begins to separate from the external phase. Thus, for a given concentration of organic solvent, after the MF pre-condensate is added to this aqueous solution the temperature thereof is adjusted at just above the turbidity point of the solution so that the MF pre-condensate is barely soluble therein. In addition, the aqueous solution is maintained under an alkaline pH to prevent MF-solvent side reactions.

When the MF pre-condensate and solvent are initially introduced into the external phase, the temperature is maintained at or above the turbidity point of the resultant mixture. In the preferred embodiment of a water/methyl glucoside blend, the useful concentration ranges are from about 80–55% water, and from about 20–45% methyl glucoside. Within these weight ranges, the point of turbidity for Cymel 401 is between about 35°–50° C.

By subsequently decreasing the organic solvent concentration (by, e.g., adding water) or lowering the temperature of the mixture below the turbidity point thereof, the MF pre-condensate will become insoluble in the external phase and will separate therefrom. Thus, an effective and easily controlled means of liquid-liquid phase separation of the MF pre-condensate is provided by the present invention. The strategic utilization of this liquid-liquid phase separation technique is an important aspect of implementing the MF self-condensation reaction under acidic conditions while avoiding MF-solvent side reactions in the external phase.

Into the completed external phase, the internal phase is dispersed. Preferably, a protective colloid is used to stabilize the resultant emulsion. Any of the commonly used protective colloids as found in the prior art may be used for this purpose. Examples include hydrolyzed maleic anhydride copolymers, polyvinylpyrrolidone (PVP) homopolymers and copolymers, polyvinyl alcohol, casein, gelatin, or acrylic acid/ester copolymers. Especially preferred is a reactive, protective colloid produced by coupling a surface active polymer to a MF pre-condensate which is described in my copending U.S. application entitled MICROENCAPSULATION PROCESS USING MELAMINE-FORMALDEHYDE AND MICROCAPSULES PRODUCED THEREBY, Ser. No. 07/625,435, filed on or about Dec. 11, 1990, the disclosure of which is hereby incorporated by reference. Throughout this dispersion step, the temperature of the emulsion is maintained above the turbidity point of the external phase so that the MF pre-condensate remains barely soluble therein.

The internal phase includes a substance to be encapsulated which can be any of a number of gaseous, liquid, or solid substances which are substantially insoluble in water such as organic hydrocarbons, oils, waxes, adhesives, flavorings, colorants, perfume oils, pigments, or the like. In a preferred embodiment of the invention, the substance to be encapsulated is an oily solution having dissolved therein a dyestuff precursor (or developer) capable of reacting with a color developer (or dyestuff precursor) to form a color. Any of the dyestuff precursors (or developers) known in this art may be utilized. In this manner, the MF microcapsule coating slurry of the present invention can be used as a CB coating for carbonless copy paper.

The next step in the preparation of the MF microcapsules of the present invention is to disperse the internal phase (that is, e.g., the oily solution to be encapsulated containing therein dissolved dyestuff precursor) into the external phase. During this procedure, the external phase is maintained at or above its solution temperature (that is, for example, 35.C in the case of a 67.5% water, 32.5% methyl glucoside blend) This is the temperature where the MF pre-condensate dissolved therein becomes turbid on cooling. Preferably, the emulsion thus formed is a stable one, as stable emulsions facilitate the microencapsulation process.

As mentioned above, an important aspect of producing MF microcapsules in an aqueous solution containing a high concentration of organic solvent is separating the MF pre-condensate from the external phase before initiating the MF self-condensation reaction so that MF-solvent side reactions are minimized. This can be accomplished in a number of ways. A first way is to cool the internal phase/external phase emulsion to a temperature below the turbidity point of the external phase (i.e., below the temperature at which MF pre-condensate remains soluble in the external phase). When this occurs, a significant portion of the MF pre-condensate becomes insoluble in the external phase and thereby separates out to collect at the internal phase/external phase interface.

Thus, as the MF pre-condensate separates from the external phase, the oil droplets containing therein dissolved dyestuff precursor are enveloped by a liquid film of MF pre-condensate. At this point, the pH can be lowered to initiate the MF self-condensation reaction.

A second way to separate the MF pre-condensate from the external phase before initiating the MF self-condensation reaction is to decrease the organic solvent concentration in the external phase to a point at which a significant portion of the MF pre-condensate becomes insoluble in the external phase and thereby separates out to collect at the internal phase/external phase interface. Preferably, this is accomplished by diluting the emulsion with water. As with the first method, a liquid film of MF pre-condensate collects on and envelops the droplets of the substance to be encapsulated.

Yet another way to effect the separation of the MF pre-condensate from the external phase before initiating the MF self-condensation reaction is to simultaneously decrease the emulsion temperature to a value below the turbidity point of the external phase and to decrease the organic solvent concentration in the aqueous solution.

Regardless of which of the above liquid-liquid phase separation techniques are employed, the net result is that the soon-to-be-encapsulated droplets are enveloped in a film of liquid MF pre-condensate that is insoluble in the external phase. At this stage, most of the MF pre-condensate will have separated from the external phase and will now be surrounding the oil droplets. As to this portion of the MF pre-condensate, the pH can be lowered to just below about 7 0 to initiate the MF self-condensation reaction without concern for MF-solvent side reactions. No reaction will occur between the separated MF pre-condensate and the organic solvent because each now exists in separate liquid phases. When the pH is lowered, preferably by the addition of acid to the emulsion, the liquid MF pre-condensate surrounding the oil droplets will begin to condense. At the conclusion of this reaction, a hardened shell composed of an insoluble, crosslinked polymer will encapsulate each oil droplet.

The water dilution decreases the organic solvent concentration of the aqueous solution/external phase to induce further phase separation of the MF pre-condensate onto the oil droplets. Preferably, the amount of water added at this stage is from 1% to 3% of the total volume of the emulsion. Simultaneously, the pH of the emulsion is reduced in order to initiate the self-condensation reaction of the MF pre-condensate. Preferably, the pH reduction is implemented by adding an aqueous solution of acid to the emulsion. By thus simultaneously reducing the pH of the emulsion and adding water thereto, the phase-separated film of MF pre-condensate begins to condense and thereby harden into microcapsule shells while newly separated MF pre-condensate accumulates on top of the original MF pre-condensate film.

Under acidic pH conditions, this new layer of MF pre-condensate will begin to self-condense as well. Subsequent pH reductions and water dilutions will continue this process so that a thick, hard capsule wall is formed in layers around the internal phase droplets. In addition, by virtue of the water dilutions, a decreasingly small portion of MF pre-condensate remains soluble in the external phase. Thus, MF-solvent side reactions are minimized while MF capsule wall formation is maximized.

As to the increasingly small portion of MF pre-condensate that will remain in solution in the external phase following each stage wise water addition, a substantial fraction of this MF pre-condensate will be so near the point of separation from the external phase that only a small degree of condensation will result in phase separation of this fraction. Thus separated, this MF fraction will also contribute to microcapsule wall formation. The end result of the MF microencapsulation process of the present invention is that only a very small fraction of the original MF pre-condensate will react with the organic solvent. The majority of the MF pre-condensate will self-condense around the internal phase droplets to form thick, hard microcapsule walls.

Another feature of the present invention is that gradual heating can be employed at the lower pH condensation stages. This facilitates the condensation reaction and allows sequential temperature drops to take place in addition to pH adjustments and water additions. Such gradual temperature increases are permissible because the condensation reaction time in the separated portion of the MF pre-condensate is fairly short so that very little of the previously separated MF pre-condensate will re-dissolve into the external phase upon heating. Furthermore, any MF pre-condensate that does will, for the most part, be re-deposited upon subsequent cooling and/or water additions.

Thus, preferably between each pH reduction/water dilution step, the emulsion is stirred and gradually heated for a period of time to facilitate the MF self-condensation reaction, typically from about one to two hours. After about two hours, the emulsion is again cooled to a temperature below that of the turbidity point of the external phase. This results in further liquid-liquid phase separation of the MF pre-condensate.

The emulsion is again diluted with water, further reduced in pH, gradually heated and stirred, and then cooled. This procedure is repeated until the pH is reduced to below about 5.0, and preferably about 4.4, and substantially all of the MF pre-condensate has separated from the external phase and condensed around the internal phase droplets to complete the microencapsulation process. The pH of the final MF microcapsule coating is then adjusted to a neutral pH. This coating comprises a slurry of thick, hard MF microcapsules in an aqueous solution containing a high concentration of organic solvent.

Another preferred method for producing the MF microcapsule coating of the present invention is similar to those discussed above except that the temperature of the solution is kept constant throughout the process. MF pre-condensate phase separation is effected solely by water dilution of the aqueous solution containing organic solvent.

The external phase preparation and internal phase emulsification therein are carried out as discussed above. Thus, the temperature and organic solvent concentration of the external phase are adjusted so that MF pre-condensate is barely soluble therein, the pH of the external phase is maintained under alkaline conditions, and the organic solvent and MF pre-condensate are selected from the same respective groups as set forth above.

Phase separation of the MF pre-condensate is then initiated. While maintaining a constant temperature, the emulsion is simultaneously diluted with water and reduced to a neutral pH of about 7. In the preferred embodiment of a water/methyl glucoside blend using Cymel 401 MF pre-condensate, the preferred temperature is from about 35°–45° C. The amount of water to be added is determined by the solubility curve of the MF pre-condensate as a function of percent organic solvent in water. The water dilution induces MF pre-condensate phase separation by rendering a substantial portion thereof insoluble in the external phase. Thus separated, this portion of the MF pre-condensate envelops the internal phase droplets. By simultaneously reducing the pH to about 7, neither MF self-condensation nor MF-solvent side reactions begin. This allows most of the MF pre-condensate to separate from the external phase onto the oil droplets. MF-solvent side reactions are thereby minimized.

After holding the emulsion at a pH of about 7 for a time sufficient for phase separation to occur, typically about one to two hours, the emulsion is again simultaneously water diluted and reduced in pH preferably to about 6.5. The emulsion is held in this state for a sufficient time for phase separation to occur. This procedure is continued until the pH has been reduced to below about 5.0, and preferably about 4.5, so that substantially all of the MF pre-condensate has separated from the external phase, enveloped the droplets, and self-condensed to form a hard, thick capsule wall around the droplets.

As with the first preferred method described above, the resultant capsule wall is built up in layers around the internal phase droplets and MF-solvent side reactions are reduced to a minimum because of the decreasingly small portion of the MF pre-condensate remaining in the external phase. After the encapsulation procedure has been completed, the pH of the resultant microcapsule slurry coating is adjusted to a neutral pH.

As an alternative to performing the simultaneous water dilution/pH reduction steps in discrete segments, this process may be performed continuously with the slow addition of a dilute aqueous solution of acid over a period of time until the pH of the emulsion has been decreased to below about 5.0, and preferably about 4.5, and substantially all of the MF pre-condensate has phase-separated and self-condensed around the internal phase droplets.

Regardless of the method used, the resultant MF microcapsule coating of the present invention produces hard, thick MF microcapsules in an aqueous solution containing a high concentration of organic solvent. This MF microcapsule coating slurry can be used in applications wherein MF microcapsules are desired but where purely water-based coating vehicles are not suitable. Such a combination was heretofore not possible but is now made possible by virtue of the process of the present invention which provides a means of separating the MF pre-condensate from the organic solvent before the MF self-condensation reaction is initiated.

In order that the invention may be more readily understood, reference is made to the following example, which is intended to be illustrative of the invention, but is not intended to be limiting in scope.

EXAMPLE 1

A. Preparation of an Internal Phase

An oily solution containing dyestuff precursors was prepared by adding, in a 2 liter beaker, 808.3 gm of diisopropyl naphthalene and 36 gm of dimethyl azelate. The solution was heated to 115° C. and dissolved therein were the following dyestuff precursors: 66.2 gm Pergascript Green I-2GN, 36.0 gm Pergascript Red I-6B, 13.7 gm Pergascript Blue I-2R, and 78.1 gm Pergascript Black I-BR, color formers commercially available from Ciba-Geigy Corporation of Greensboro, NC. After a homogeneous solution was obtained, 280.6 gm Norpar 13 Special was added and the solution was cooled to 25° C.

B. Preparation of an External Phase

An aqueous solution containing a high concentration of an organic solvent was prepared by adding, in a 4 liter beaker charged with 1380.6 gm of water, the following: PVP-K90, 12.16 gm PVP-K30, polyvinylpyrrolidones having molecular weights of 360,000 and 40,000, respectively, and 25.06 gm casein. The solution was heated to 80° C., held at that temperature for 20 minutes and then cooled to 65° C. 8.2 gm of borax was then added to adjust the pH of the solution to 9.0. After heating for 30 minutes at 65° C., 180 gm of Cymel 401 (MF pre-condensate from American Cyanamid) was added. The pre-condensate did not dissolve, but dispersed as viscous droplets. Finally, 662.4 gm of methyl glucoside (organic solvent) was added. On addition, the MF pre-condensate dissolved at 42° C. The solution was cooled to 35° C.

C. Encapsulation

The external phase solution as prepared above was poured into a Waring Blender controlled through a Variac voltage regulator. With the blender on low setting and the Variac set at 60%, the internal phase solution was added to the agitated external phase solution over a 45-second period. The emulsion was further sheared for 45 seconds with the Variac turned up to 80% power. The emulsion was heated to 60° C. and held for 2 hours. The emulsion was cooled and stirred overnight.

The next day, a Meyer rod drawdown of the emulsion on a sheet of paper precoated with color developer (CF) produced intense discoloration. The CF paper had an original reflectance of 94.9% as measured by a Technidyne BNL-2 Opacimeter from Technidyne Corporation of New Albany, IN, calibrated with a Ceramic Absolute Reflectance Standard. After coating with the emulsion, the reflectance value of the paper dropped to 21.0% due to discoloration caused by the reaction of the dyestuff precursors with the color developer on the CF paper. This indicated that no capsule wall formation had occurred at the alkaline pH.

At 25° C., the pH of the emulsion was 7.4. 10 gm of a 20% citric acid solution, diluted further with 25 ml water was dropwise added to the emulsion. The pH of the emulsion was then measured to be 6.6. 6.5 gm of a 20% nitric acid solution diluted further with 17 ml water was added, lowering the pH to 6.2. The solution was then stirred for 30 minutes, gradually heated to 60° C. and held for 2 hours. 100 ml of water was added, and the solution was cooled to room temperature. The mixture was stirred overnight.

The next day, another Meyer rod drawdown of the emulsion on CF paper produced a medium amount of discoloration with a drop in reflectance value of the paper to 72.0%. This improvement indicated that some capsule formation had occurred. At 25° C., 100 ml of water was added to the emulsion, and the pH was lowered to 4.3 by the dropwise addition of 88.5 gm of a 20% citric acid solution further diluted with 80 ml of water. The emulsion was then heated to 60° C. and held for 2 hours. After cooling the emulsion back to room temperature, a Meyer rod drawdown of the emulsion on CF paper produced essentially no discoloration. The coated CF paper had a measured reflectance value of 91.6%, indicating good capsule formation.

It will be obvious to those skilled in the art that various changes may be made without departing from the scope of the invention and the invention is not to be considered limited to what is described in the specification.

What is claimed is:

1. A process for making melamine-formaldehyde microcapsules in an aqueous solution containing at least 25% by weight of a water miscible or water soluble organic solvent, comprising the steps of:
    preparing said aqueous solution containing at least 25% by weight of a water miscible or water soluble organic solvent and dissolving therein a water insoluble melamine-formaldehyde pre-condensate by adjusting the temperature and organic solvent concentration of said aqueous solution to just above the turbidity point of said aqueous solution, the pH of said aqueous solution being alkaline;
    dispersing a discontinuous phase of a substance to be encapsulated into said aqueous solution to form an emulsion, said melamine-formaldehyde pre-condensate being insoluble in said substance;
    separating said melamine-formaldehyde pre-condensate form said aqueous solution onto droplets of said substance to be encapsulated so that said droplets are enveloped in a liquid film of said melamine-formaldehyde pre-condensate; and
    initiating the self-condensation reaction of said phase-separated melamine-formaldehyde pre-condensate to form capsule walls around said droplets of said substance to be encapsulated, thereby producing melamine-formaldehyde microcapsules in said aqueous solution containing at least 25% by weight of a water miscible or water soluble organic solvent.

2. The process of claim 1 wherein said substance to be encapsulated comprises an oily solution having dissolved therein a dyestuff precursor.

3. The process of claim 1 wherein the formaldehyde to melamine mole ratio of said melamine-formaldehyde pre-condensate is from about 2:1 to 3:1.

4. The process of claim 1 wherein said melamine-formaldehyde pre-condensate is alkylated.

5. The process of claim 1 wherein the step of separating said melamine-formaldehyde pre-condensate from said aqueous solution is effected by decreasing the temperature of said emulsion to below the turbidity point of said aqueous solution.

6. The process of claim 1 wherein the step of separating said melamine-formaldehyde pre-condensate includes the steps of simultaneously diluting said emulsion with water to induce further phase separation of said melamine-formaldehyde pre-condensate onto said droplets of said substance to be encapsulated while decreasing the pH of said emulsion.

7. The process of claim 6 wherein the amount of water added in said water dilution step is from 1% to 3% of the total volume of said emulsion.

8. The process of claim 1 wherein the step of initiating said self-condensation reaction is effected by decreasing the pH of said aqueous solution to below about 7.0.

9. The process of claim 1 wherein the step of separating said melamine-formaldehyde pre-condensate from said aqueous solution and the step of initiating said self-condensation reaction are effected simultaneously.

10. The process of claim 6 wherein said simultaneous water dilution and pH reduction is carried out in a sequential stepwise fashion until the pH of said emulsion has been decreased to below about 5.0.

11. The process of claim 10 wherein between each said sequential simultaneous water dilution and pH reduction step, said emulsion is gradually heated and then cooled to a temperature below that of the turbidity point of said aqueous solution.

12. The process of claim 1 including the step of adjusting the pH of said melamine-formaldehyde microcapsules in said aqueous solution to a neutral pH.

13. The process of claim 1 wherein said organic solvent is selected from the group consisting of low molecular weight carbohydrates, glycols, polyhydric alcohols, amides, and compatible mixtures thereof.

14. The process of claim 1 wherein protective colloids are added to said aqueous solution prior to said dispersion of said oily solution.

15. The process of claim 1 wherein the step of separating said melamine-formaldehyde pre-condensate is effected by holding said temperature constant and simultaneously diluting said emulsion with water while decreasing the pH of said emulsion.

16. The process of claim 15 wherein the amount of water added in said separation step is determined by the solubility curve of said melamine-formaldehyde pre-condensate as a function of the percentage of said organic solvent in water.

17. The process of claim 15 wherein said simultaneous water dilution and pH reduction is carried out in a sequential, stepwise fashion over a period of time until the pH of said emulsion has been decreased below about 5.0

18. The process of claim 15 wherein said simultaneous water dilution and pH reduction is effected by the addition of a dilute aqueous solution of acid.

* * * * *